(12) United States Patent
Berger

(10) Patent No.: US 11,246,690 B2
(45) Date of Patent: Feb. 15, 2022

(54) DENTURE LOCK AND TOOL THEREFOR

(71) Applicants: KAMIL TECH LTD., Tortola (VG);
 Uzi Berger, Hod Hasharon (IL)

(72) Inventor: Uzi Berger, Hod Hasharon (IL)

(*) Notice: Subject to any disclaimer, the term of this patent is extended or adjusted under 35 U.S.C. 154(b) by 112 days.

(21) Appl. No.: 16/470,673

(22) PCT Filed: Dec. 19, 2017

(86) PCT No.: PCT/IL2017/051360
 § 371 (c)(1),
 (2) Date: Jun. 18, 2019

(87) PCT Pub. No.: WO2018/116296
 PCT Pub. Date: Jun. 28, 2018

(65) Prior Publication Data
 US 2019/0321150 A1     Oct. 24, 2019

(30) Foreign Application Priority Data

Dec. 19, 2016 (IL) .......................................... 249634

(51) Int. Cl.
 *A61C 13/275* (2006.01)
 *A61C 8/00* (2006.01)
 *A61C 13/01* (2006.01)

(52) U.S. Cl.
 CPC .......... *A61C 13/275* (2013.01); *A61C 8/0048* (2013.01); *A61C 8/0089* (2013.01); *A61C 13/01* (2013.01)

(58) Field of Classification Search
 CPC ... A61C 13/273; A61C 13/275; A61C 13/225; A61C 13/01; A61C 8/0027;
 (Continued)

(56) References Cited

U.S. PATENT DOCUMENTS 4,285,672 A    8/1981  Gabriel
4,400,160 A *  8/1983  Lustig ...................... A61C 5/40
                                                        433/136

(Continued)

FOREIGN PATENT DOCUMENTS

DE    29902061 U1   4/1999
DE    10000334 A1   7/2001
(Continued)

OTHER PUBLICATIONS

Google Translation of EP-0761179 (Year: 1997).*
(Continued)

*Primary Examiner* — Jacqueline T Johanas
*Assistant Examiner* — Shannel Nicole Belk
(74) *Attorney, Agent, or Firm* — Dorsey & Whitney LLP

(57) ABSTRACT

A denture lock is disclosed, comprising a tubular bushing extending between a distal end and a proximal end. The denture lock is configured with a bore accommodating a locking pin displaceable between a locked position at which the locking pin projects from the distal end of the bushing, and an unlocked position at which the locking pin is at least partially retracted. At least an external surface portion of the bushing is configured with a coupling arrangement for removably securing a denture therewithin.

20 Claims, 13 Drawing Sheets

(58) Field of Classification Search
CPC ... A61C 8/0048; A61C 8/0089; A61C 8/0093; A61C 8/0095; A61C 13/267; A61C 13/2656; A61C 8/0057
USPC .............................. 433/172, 173, 174, 199.1
See application file for complete search history.

(56) References Cited

U.S. PATENT DOCUMENTS

| | | | | |
|---|---|---|---|---|
| 2006/0269902 | A1* | 11/2006 | Weissman | A61C 13/01 433/173 |
| 2012/0171639 | A1 | 7/2012 | Berger | |
| 2012/0214128 | A1* | 8/2012 | Collins | A61C 8/0006 433/173 |
| 2013/0149668 | A1* | 6/2013 | Chen | A61C 8/0022 433/174 |
| 2014/0178839 | A1 | 6/2014 | Berger | |
| 2015/0164620 | A1* | 6/2015 | Berger | A61C 8/0068 433/173 |
| 2015/0272705 | A1* | 10/2015 | Watson | A61B 6/14 433/173 |
| 2016/0067016 | A1* | 3/2016 | Hur | A61C 8/0089 433/147 |
| 2018/0110594 | A1* | 4/2018 | Atkin | A61C 8/0048 |

FOREIGN PATENT DOCUMENTS

| | | | | |
|---|---|---|---|---|
| EP | 0761179 A1 * | 3/1997 | ........... | A61C 13/273 |
| EP | 0761179 A1 | 3/1997 | | |

OTHER PUBLICATIONS

International Search Report and Written Opinion from International Application No. PCT/IL2017/051360 dated Mar. 27, 2018.

* cited by examiner

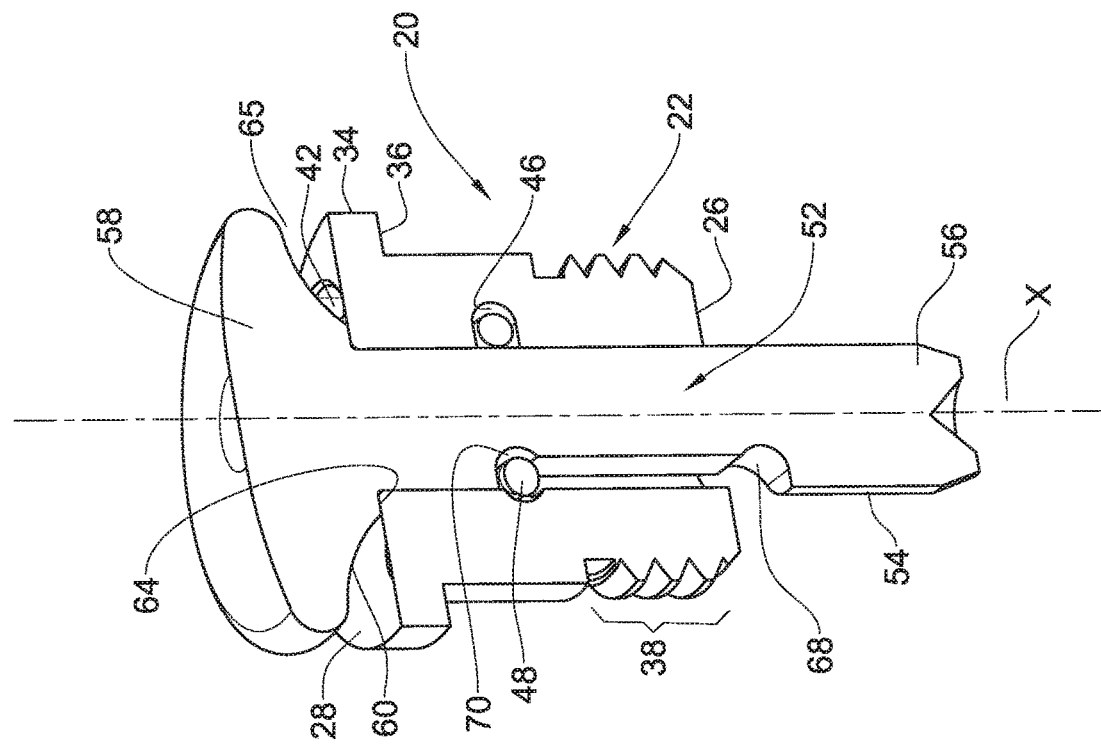
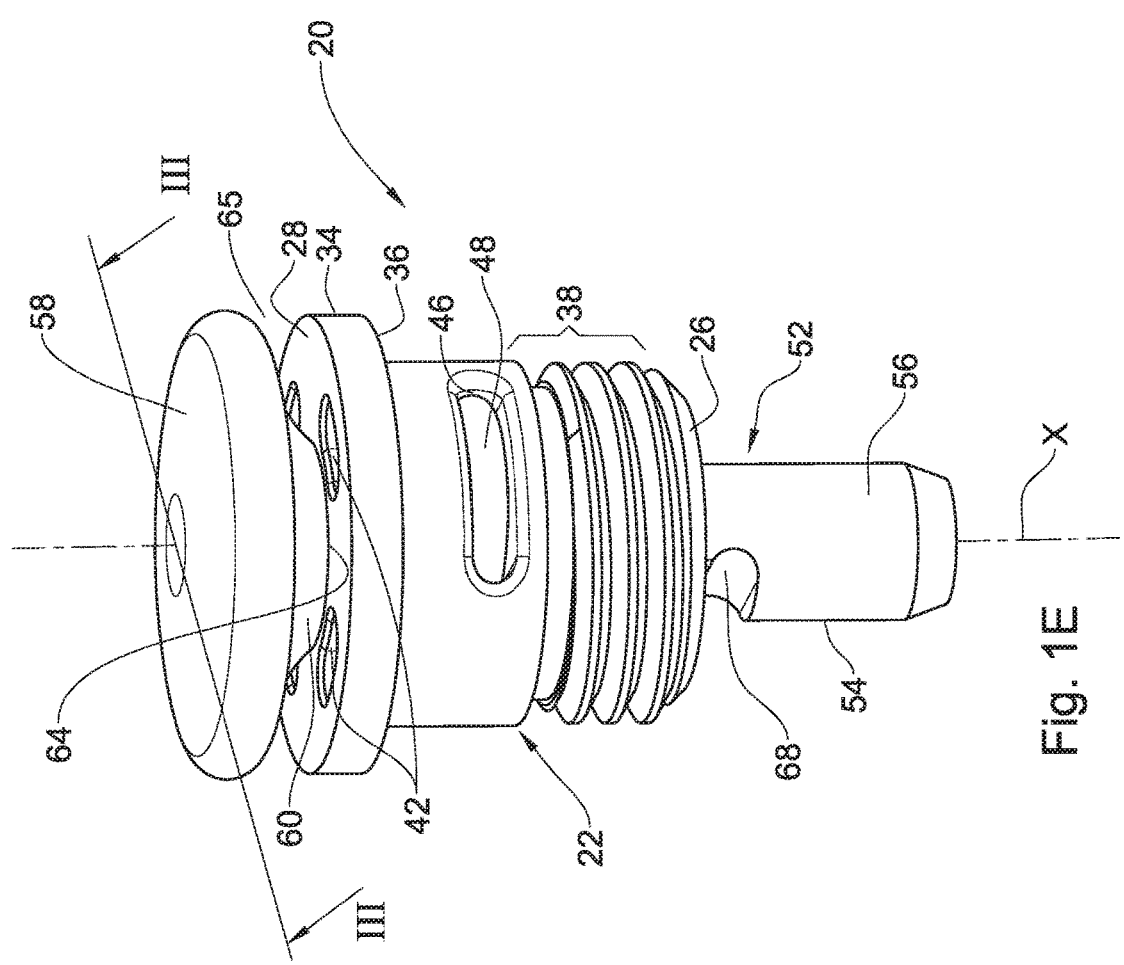
Fig. 1E
Fig. 1F

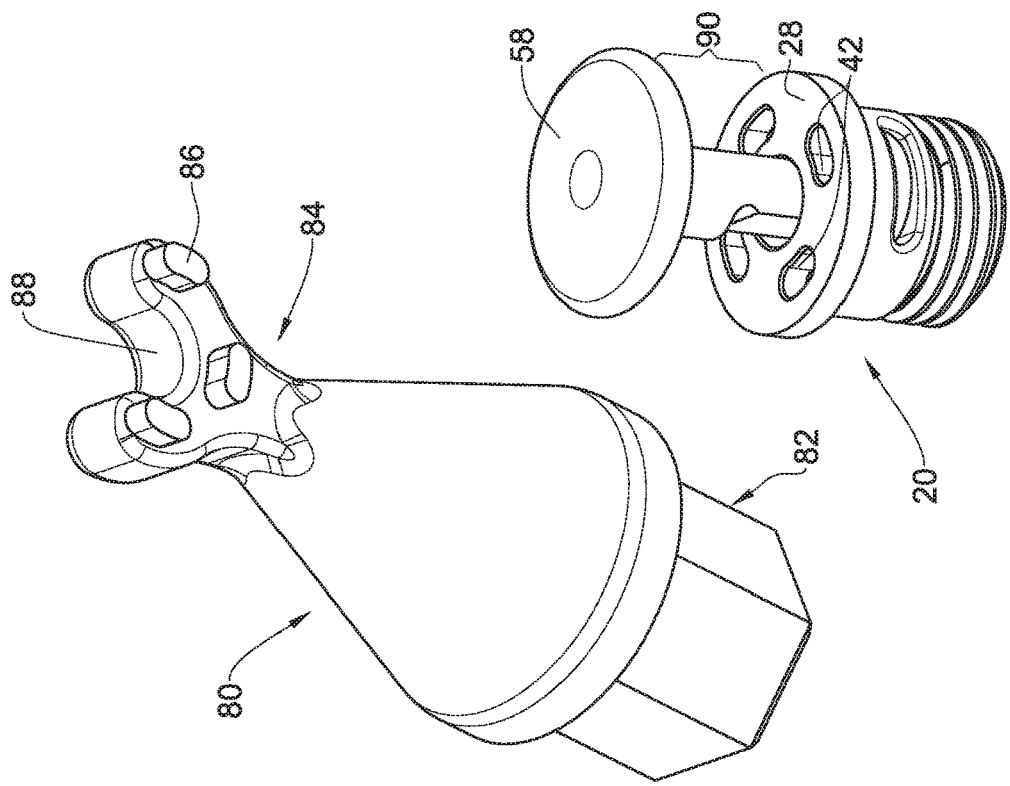
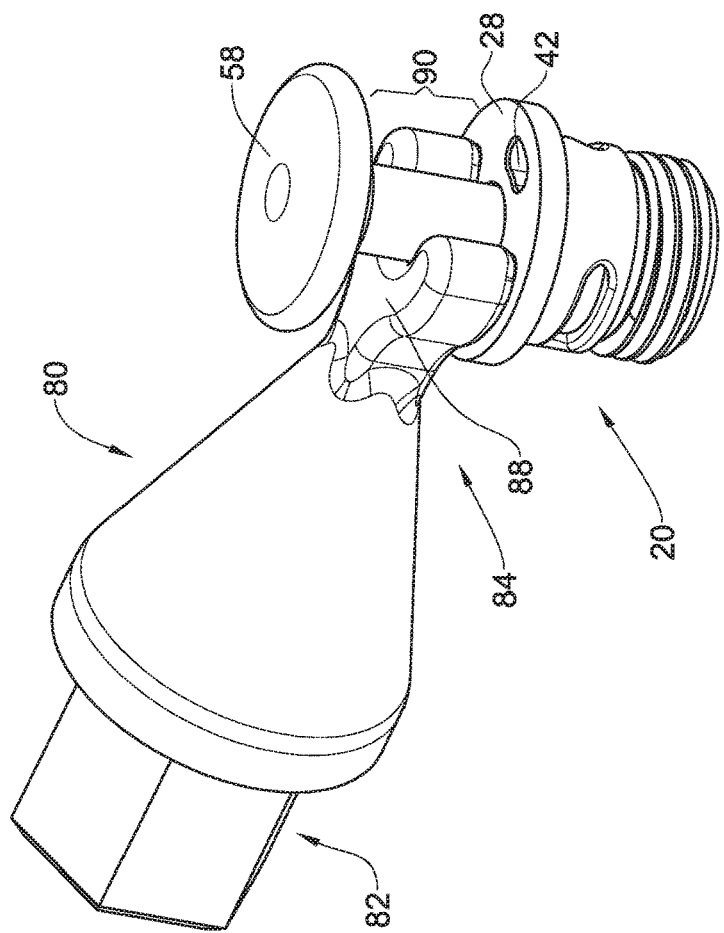

DENTURE LOCK AND TOOL THEREFOR

TECHNOLOGICAL FIELD

The present disclosure is concerned with a denture lock of the type used for removably attaching a denture over a dental support bar. More particularly the disclosure is directed to a pin-type lock wherein a pin is displaceable between a retracted, locked position, and a extracted, unlocked position. The disclosure is further concerned with a denture accommodating such a lock, and tool useful for manipulating such a lock.

BACKGROUND

Partial or complete loss of an individual's natural teeth, either or both at the upper and lower jaw, due to age, injury, disease, or any other reasons may have a negative impact, for example functionally and/or socially.

Dental implant systems are commonly used to provide artificial teeth, by providing teeth- and/or gum-mimicking implants in place of the missing teeth. Such system typically comprise a support system, such as a support bar or one or more abutments, which are fixed to the alveolar ridge of an individual, and a superstructure mounted thereon, which includes the mimicking portions. The superstructure is often removable by the individual, for example to facilitate cleaning, repair, replacement, etc. The support system may be directly affixed to the individual, or attached to dental implants within the alveolar ridge.

Such implant system often include a denature lock, for example comprising a manually manipulable locking pin secured within the denture. The denture lock allows securing the superstructure to the support system, and selective removal thereof by the individual.

SUMMARY

According to the present disclosure there is a pin-type denature lock, of the type comprising a manually manipulable locking pin displaceable between a projecting, locked position, and a retracted, unlocked position, and wherein the lock is removably secured within a denture. The lock is configured for removably attaching a denture over a support member which in turn is securable to a jawbone of an individual.

The term 'denture' as used herein in the specification and claims denotes a dental prosthesis comprising a teeth mimicking portion configured with a superstructure for removably mounting over a support member, and wherein the superstructure is either integrally formed with the teeth mimicking portion or integrated therewith.

The term 'support member' as used herein in the specification and claims denotes a support bar or an abutment, secured to a jawbone of an individual by fixed studs.

According to a first aspect of the present disclosure there is a denture lock comprising a tubular bushing extending between a distal end and a proximal end and configured with a bore accommodating a locking pin displaceable between a locked position at which the locking pin projects from the distal end of the bushing, and an unlocked position at which the locking pin is at least partially retracted, and wherein at least an external surface portion of the bushing is configured with a coupling arrangement for removably securing a denture therewithin.

The proximal end of the bushing is configured with a tool engaging portion facilitating insertion and removal of the dental lock from the denture.

The locking pin is configured with a locking end associated with the distal end of the bushing, and a manipulating end associated with the proximal end of the bushing, respectively.

According to another aspect of the present disclosure there is a denture comprising a teeth mimicking portion and a superstructure portion configured for steadily securing over a support member, wherein the denture is configured with a lock receptacle which in turn is configured with a coupling arrangement for removably receiving a removable denture lock; said denture lock comprising a tubular bushing extending between a distal end and a proximal end and configured with a bore accommodating a locking pin displaceable between a locked position at which the locking pin projects from the distal end of the bushing, and unlocked position at which the locking pin is at least partially retracted.

The lock receptacle of the denture can be configured at the teeth mimicking portion or at the superstructure portion, or it can extend through both said teeth mimicking portion or at the superstructure portion. Where the lock receptacle of the denture is configured at the teeth mimicking portion, there may be applied a sleeve fixedly and permanently secured within the teeth mimicking portion, and wherein an inside surface of said sleeve is configured with a coupling arrangement for removably engaging with the coupling arrangement of the dental lock.

According to one particular configuration the coupling arrangement is a threading applied over at least a portion of an external surface of the bushing, wherein the bushing can be screw fastened within a corresponding threaded lock receptacle configured within the denture or a receiving sleeve.

According to yet an aspect of the disclosure there is a lock tool configured for cooperating and manipulating a denture lock according to the disclosure, said tool comprising a griping portion and a handle portion, said griping portion configured for interconnecting with a tool engaging portion at a proximal end of a bushing of the dental lock.

Any one or more of the following features, designs and configurations can be applied in a dental lock and a denture, according to the present disclosure, separately or in various combinations thereof:

- The tool engaging portion at the proximal end of the bushing of the dental lock is configured with a tool engaging socket at one or both of a peripheral portion and a head portion of the bushing;
- The tool engaging portion can be a polygonal shape, complete or partial, configured for interlocking with a corresponding polygonal shape, complete or partial, at a gripping portion of a lock tool;
- The tool engaging portion can be one or more depressions configured for interlocking with corresponding projections configured at a gripping portion of a lock tool;
- The lock tool can be a pin spanner (at times referred to as a pin wrench);
- The gripping portion of the lock tool can be configured with a recess for receiving a manipulating portion of the locking pin;
- The gripping portion of the lock tool can be configured for engaging the tool engaging portion at the proximal end of the bushing of the dental lock at either an axial orientation and a lateral orientation;

The locking pin can be displaceable between a distinct unlocked position and a distinct locked position;

The locking pin can be snapingly arrested at its respective unlocked position and locked position;

At an unlocked position the locking pin can be fully retracted and substantially not project from the distal end of the bushing;

A distal end of the locking pin can be chamfered or rounded for easy insertion into a locking hole of the support member;

The dental lock can further comprise a retention member extending through the bushing and configured for restricting axial displacement of the locking pin within the bushing;

The retention member can be a spring member extending through a lateral spring retention aperture at the bushing, said retention member can be a substantially U-shaped;

The spring retention aperture at the bushing intersects a through-going bore of the bushing;

The spring retention aperture at the bushing extends across a diameter of the bushing and has opposite open ends;

The spring retention aperture of the bushing can be symmetric at its opposite ends, whereby the retention member can be introduced through either end thereof;

The locking pin can be configured with a cylindrical portion slidingly displaceable within the bore of the bushing, having a locking end associated with the distal end of the bushing, and a manipulating end associated with the proximal end of the bushing, respectively;

The cylindrical portion of the locking pin can be configured with a flat portion, with at least a partial annular groove at respective axial ends of the flat portions, wherein said locking pin is axially displaceable within the bushing at an extent corresponding with the distance between said partial annular grooves, and wherein said annular grooves provide distinct positioning at the respective locked position and unlocked position;

The cylindrical portion of the locking pin is configured for snug coaxial displacement within the bore of the bushing;

A proximal end of the locking pin is configured with a manipulating member;

The manipulating member of the locking pin can be a thin disc-shaped plate;

The manipulating member can be configured for fingernail griping by an individual, wherein a space extends between the proximal end of the bushing and a respective face of the manipulating member, for a user to insert a finger nail or a manipulating tool, so as to aid in retracting the locking pin;

At the locked position the manipulating member of the locking pin extend in close proximity to a proximal end of the bushing, either flush against a proximal face of the bushing or leaving a narrow interstice therebetween;

The bushing can be configured at its proximal end with a laterally projecting skirt portion, wherein a bottom face of said skirt portion, facing towards the distal end, is configured for restricting axial insertion of the dental lock into a lock receptacle of a denture;

The skirt portion of the bushing can be configured with the tool engaging portion. Said tool engaging portion can be configured as polygonal nut capturing portion, or as one or more recesses for engagement by a pin spanner tool;

The tool configured for cooperation with a bushing of the type comprising a skirt portion, can comprise engagement projections having a projecting length substantially similar to the thickness of the skirt portion;

A proximal end face of the bushing can be configured with the tool engaging portion. Said tool engaging portion can be configured polygonal nut capturing portion, or as one or more recesses for engagement by a pin spanner tool;

The bushing is screw fixable within the lock receptacle of the denture in an openable manner. The bushing can be set within the denture by an adhesive agent, however openable upon applying moderate force;

The denture can be configured with a sleeve fixed thereto, said sleeve fitted with an internal threading which in turn is configured for screw-accommodating the dental lock; this arrangement can be useful in case the dental lock is configured for applying within a denture made of less durable material, e.g., acrylics and the like;

The lock receptacle can be integral with the denture (e.g., through a milling process) or it can be integrated thereto (e.g., by adhering, welding etc.);

The lock receptacle can be a boss extending from the support member

The dental lock can be configured of a maximum of three components, namely a bushing, a locking pin and a spring member.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 1E is a top perspective view of the dental lock of FIG. 1A, the lock illustrated at its locked positon;

FIG. 1F is a longitudinal section along line III-III in FIG. 1E;

FIG. 2A is a top perspective view illustrating the dental lock of FIG. 1A, superimposed with a suitable tool;

FIG. 2B is a perspective view illustrating the dental lock and the tool of FIG. 2A, apart from one another;

DETAILED DESCRIPTION

Figure 1B:
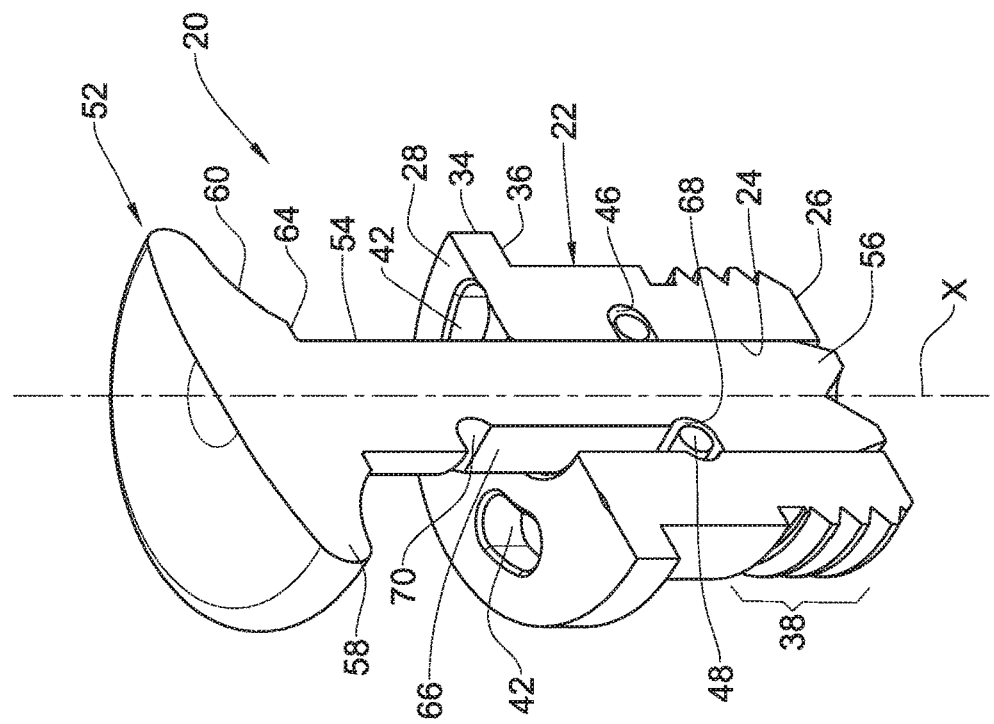
FIG. 1B is a longitudinal section along line I-I in FIG. 1A.

Attention is first directed to FIGS. 1A to 1E of the drawings, directed to a dental lock according to a first example of the present disclosure, generally designated 20.

The dental lock comprises a cylindrical bushing 22 configured with an axial through going bore 24 extending along a longitudinal axis X, between a distal end 26 and a proximal end 28. Bushing 22 is configured at its proximal side with a lateral skirt portion 34 having a bottom face 36 and a top face constituting said proximal end of the bushing.

The bushing 22 is further configured at its outer face with a coupling arrangement, namely a threaded portion 38 which at the present example extends at a distal portion of the bushing, though according to other examples the threaded portion may be disposed adjacent the proximal portion of the bushing, or span the entire length of the bushing, or extend at a middle portion or even be intermitted.

The proximal face 28 of the bushing 22 is configured with a tool engaging portion which in the illustrated example is in the form of four indentations 42, equally angularly distributed and mildly arced.

The bushing 22 is further configured with a flat, through going lateral aperture 46, extending about a diameter of the bushing and intersecting the bore 24, said lateral aperture 46 serving as a spring retention opening, accommodating a U-like spring 48 (seen best in FIG. 1D), serving as a locking pin retention member. It is appreciated that other shapes and forms of retention members can be facilitated, e.g., an O-ring, and the like (not shown).

Finally, the dental lock 20 further comprises a third member, namely locking pin 52 comprising a generally cylindrical shank portion 54, sized for snug sliding displacement within the bore 24 of bushing 22. The locking pin is configured with a distal, locking end 56, having a chamfered end (or any other suitable shape, such as a rounded end, etc.; not illustrated), and a manipulating end 58 at a proximal end thereof. The manipulating end 58 is a rounded disc-shaped or button-like shaped head portion, configured with a bottom curved surface 60, and a an annular flat stopper portion 64 for engaging the proximal face 28 of the bushing 22 at a locked/closed position of the dental lock 20 (FIGS. 1E and 1F). The manipulating end 58 is rounded and smooth, so as not to cause irritation within an individual's mouth.

Figure 1A:
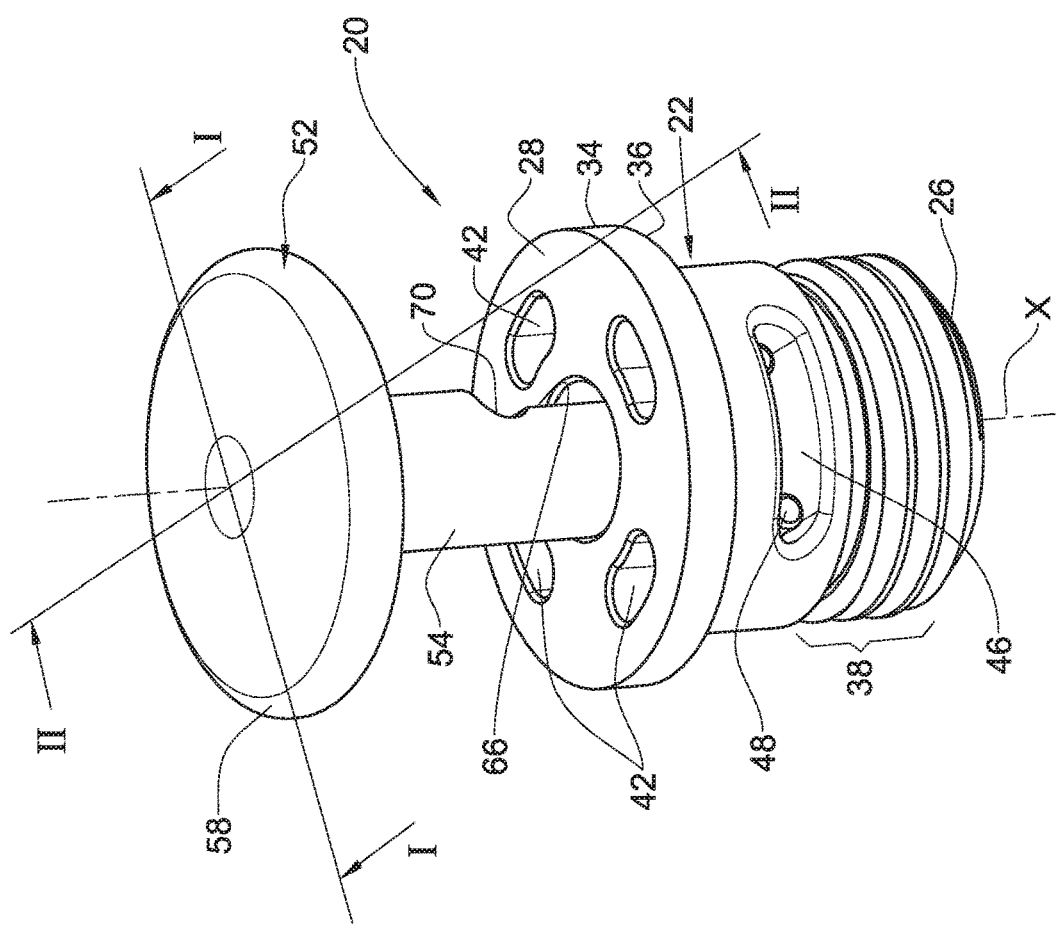
FIG. 1A is a top perspective view of a dental lock according to an example of the disclosure, the lock illustrated at its unlocked/open positon.
Figure 1D:
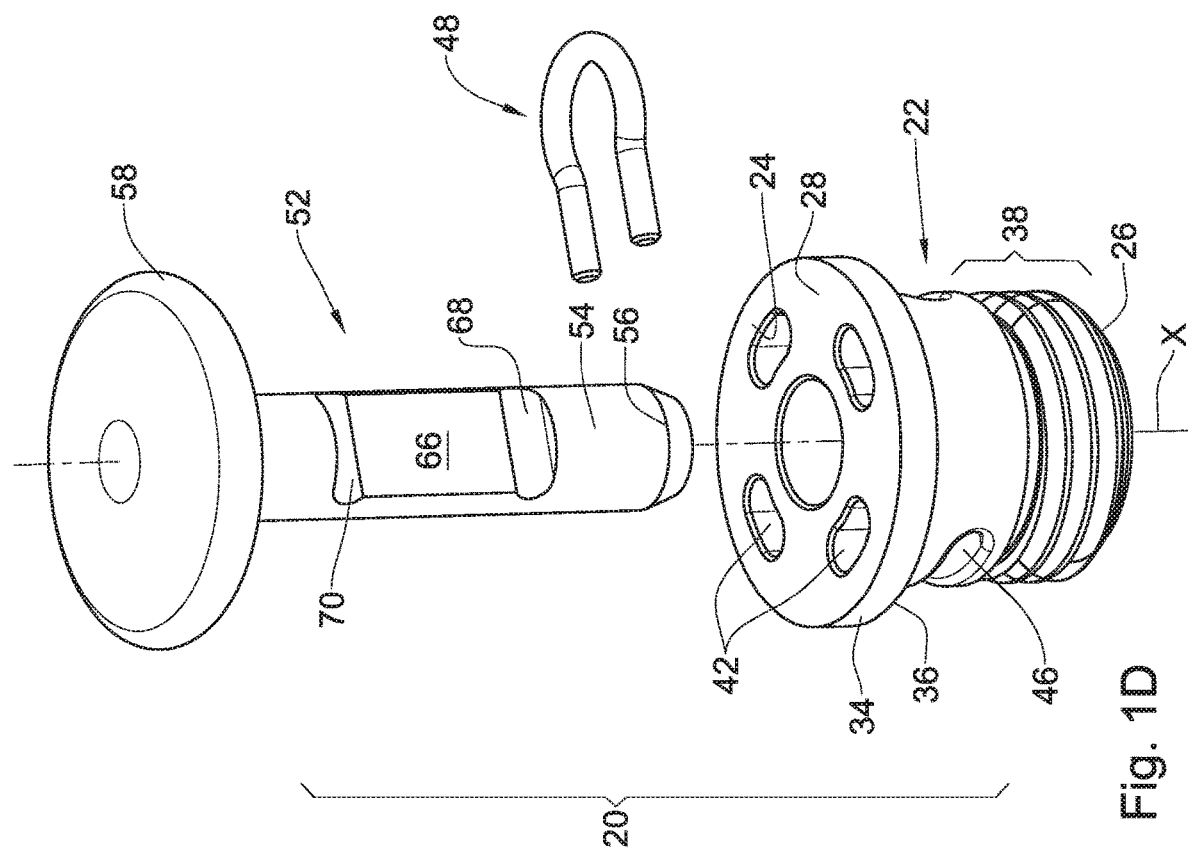
FIG. 1D is an exploded view of the lock of FIG. 1A.
Figure 1C:
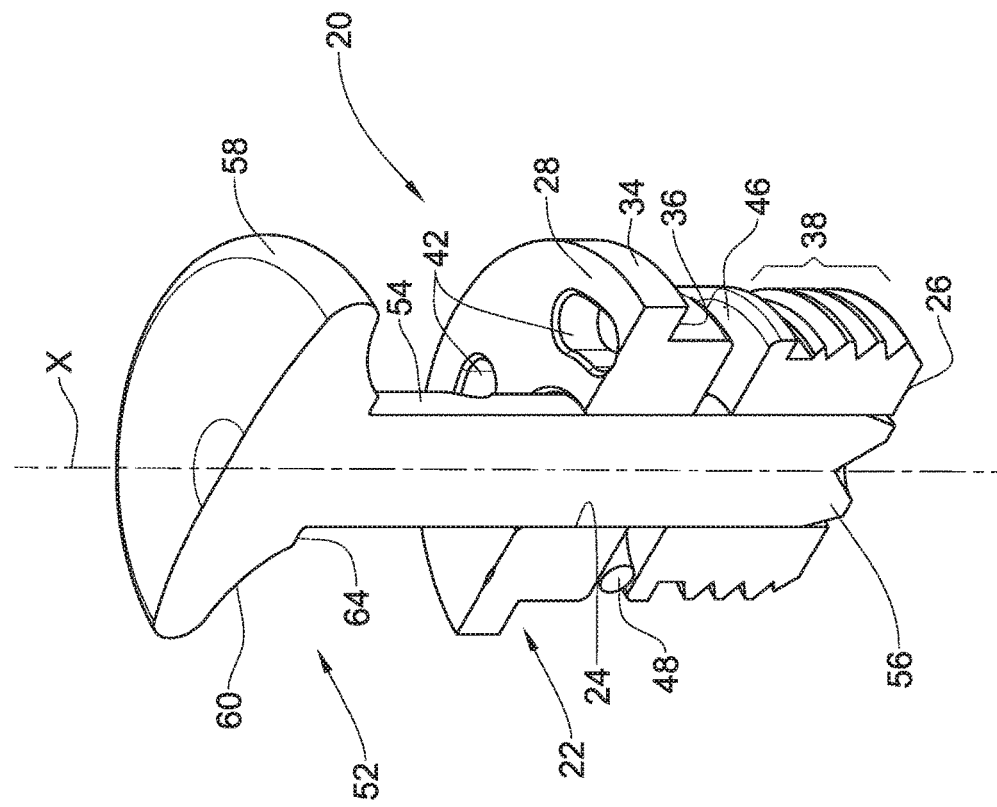
FIG. 1C is a longitudinal section along line II-II in FIG. 1A.

The arrangement is such that at the locked position (FIGS. 1E and 1F) there exists a gap 65 between the bottom face of the manipulating end 58 and the proximal/top face 28 of the bushing 22, so as to facilitate an individual to use a finger nail for manipulating the locking pin 52 into the unlocked position (as in FIGS. 1A to 1C).

Further seen, the locking pin 52 is configured at a middle portion thereof with a flattened ('shaved') surface portion 66, extending between a distal retention member arresting groove 68, and a proximal retention member arresting groove 70, parallely extending with respect to one another, and each having a diameter slightly greater than the diameter of the retention spring 48.

With further reference being made now to FIGS. 2 to 6 there are illustrated various examples and modifications of dental locks and tools configured for use in conjunction therewith. The differences between the different embodiments reside in the configuration of the tool engaging portion at the proximal end of each bushing, and the tool configured for interlocking therewith and manipulation of same, namely coupling the dental lock within a denture, as will be discussed hereinafter with further reference to FIGS. 7 and 8.

The dental lock 20 illustrated in FIGS. 1A to 1F is illustrated in FIGS. 2A and 2B in association with a tool lock generally designated 80, configured for use in conjunction with the lock 20. The tool 80 comprises a handle portion 82 which in the present example is a hexagonal shank which can be hand gripped or fitted to a wrench or other manipulating tool (not shown). An opposite side of the tool 80 is configured with a gripping portion 84 which is configured for interconnecting with the tool engaging portion of the dental lock 20, namely with the indentions 42 at the proximal end of the lock. The gripping portion 84 is thus configured as a pin wrench with three projecting lugs 86 disposed over an imaginary arc of a U-shaped grip 88, sized and shaped for lateral insertion and placing at an expanded gap 90 extending between the bottom face of the manipulating end 58 and the proximal/top face 28 of the bushing 22 while at the unlocked position.

Once the lugs 86 of tool 80 are interlocked with the indentions 42 of lock 20 (as in FIG. 2A), then the lock can be manipulated, i.e., screw fastened into a denture, or removed therefrom, as will be discussed hereinafter with reference to FIGS. 7 and 8.

Figure 2D:
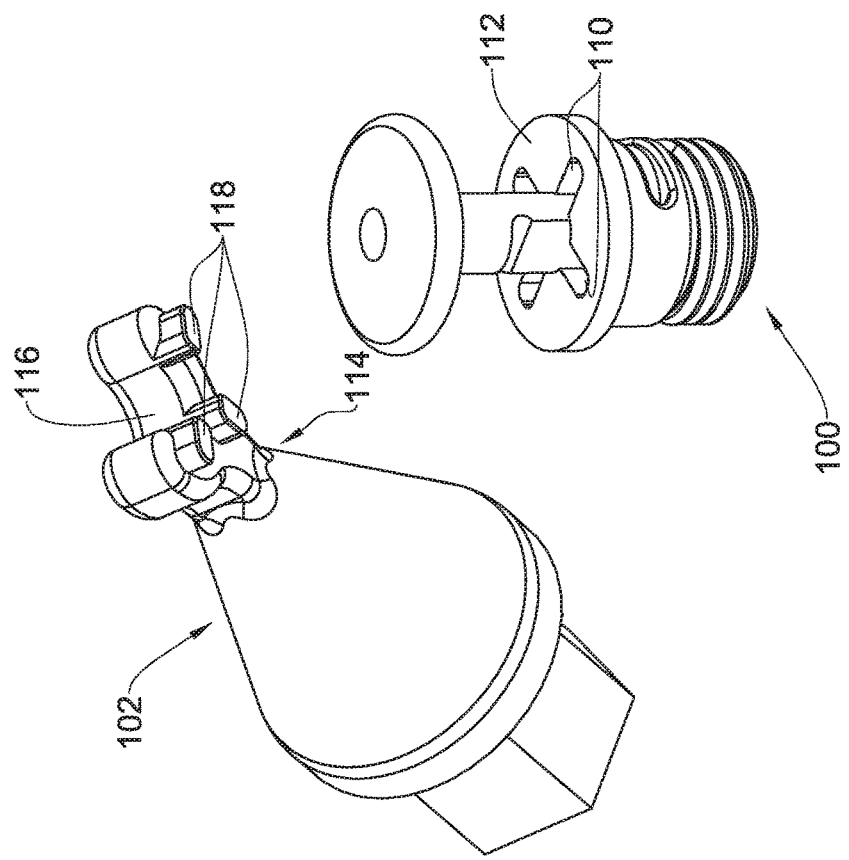
FIG. 2D is a perspective view illustrating the dental lock and the tool of FIG. 2C, apart from one another.
Figure 2C:
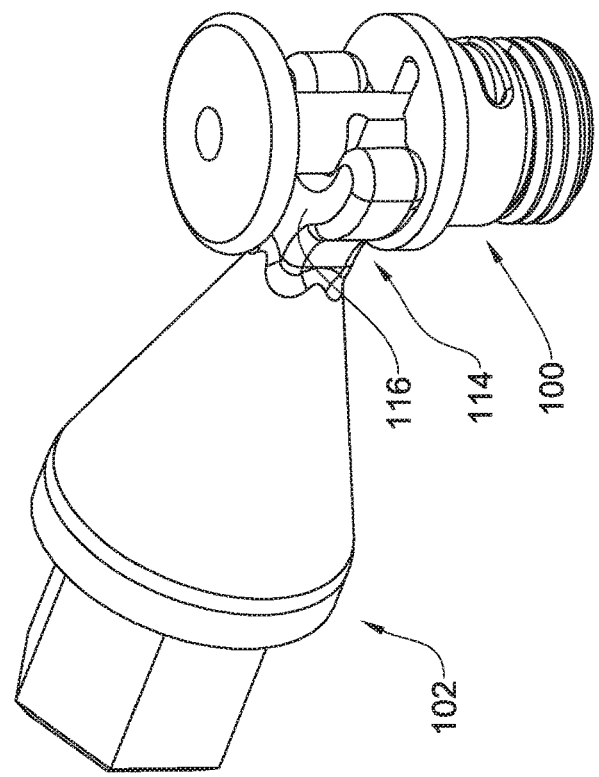
FIG. 2C is a top perspective view illustrating a dental lock according to a modification of FIG. 1A, superimposed with a suitable tool.

In FIGS. 2C and 2D there is illustrated a modification of a dental lock generally designated 100 and a tool for use therewith and generally designated 102. It is appreciated that the general shape and construction of the lock 100 are similar to those of the lock 20 illustrated in detail with reference to FIGS. 1 and 2, however with a difference residing in the shape of the tool engaging portion, namely the four indentations 110 which are disposed at the proximal face 112 of the bushing at an equally arranged radial configuration. Likewise, a gripping portion 114 of the tool 102 has a U-shaped grip 116 configured with three projecting lugs 118 radially disposed, sized and shaped for interlocking with the indentations 110 of the lock 100. Once the lugs 118 of tool 102 are interlocked with the indentations 110 of lock 100 (as in FIG. 2C), then the lock can be manipulated, e.g., screw fastened into a denture, or removed therefrom, as will be discussed hereinafter with reference to FIGS. 7 and 8.

It is however appreciated that the tool engaging portion at the proximal end of the dental lock, and respectively the gripping portion of a tool configured for use in conjunction with such a dental lock, can assume different configurations, with only several examples illustrated herein. However, the gripping portion of a tool can be configured with any number of engaging lugs (even one, as known per se in connection with pin wrenches), or the gripping portion can be shaped as a hex wrench (an example is illustrated in FIGS. 6A and 6B hereinafter). The tool can be configured for lateral engagement with the dental lock (as exemplified herein before and also with reference to FIGS. 4, 6 and 8) or for axial interlocking, as will be discussed hereinafter with reference to FIGS. 5 and 7.

Figure 3:
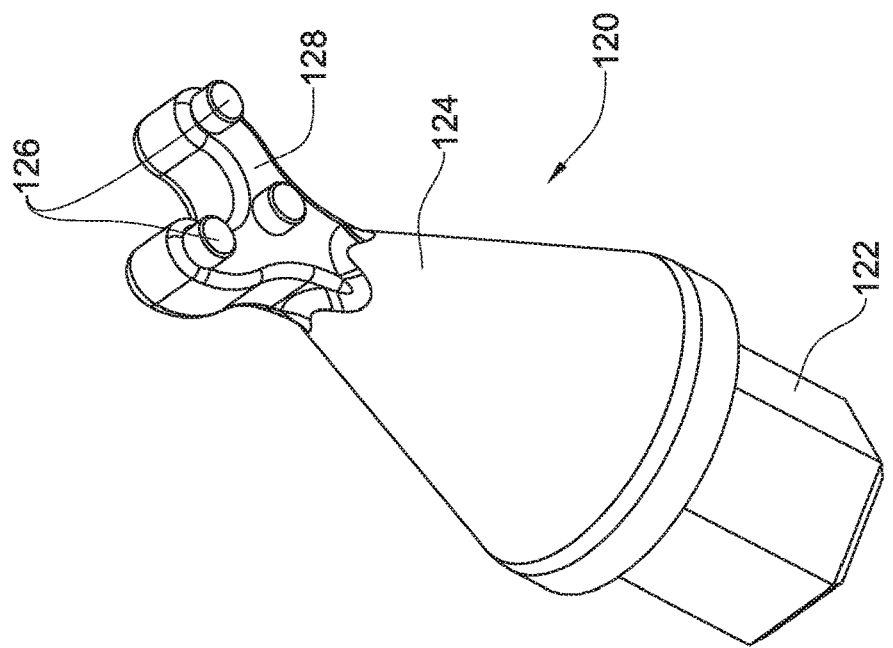
FIG. 3 is a bottom perspective view of another example of dental lock tool the disclosure, suited for use in conjunction with a dental lock.

In FIG. 3 there is illustrated a tool 120 for use with a dental lock according to the disclosure, said tool comprising a hexagonal shanked handle portion 122 and a gripping portion 124 which is configured for interconnecting with a tool engaging portion of a dental lock as discussed herein. The gripping portion 124 is configured as a pin wrench with three cylindrical projecting lugs 126 disposed over a U-shaped grip 128, sized and shaped for lateral insertion and placing at an expanded gap of the lock while at the unlocked position, as discussed herein before. The tool 120 can be used with a lock configured with circular indentions (not shown) or with elongate indentions as illustrated in connection with any of the other examples.

Figure 4A:
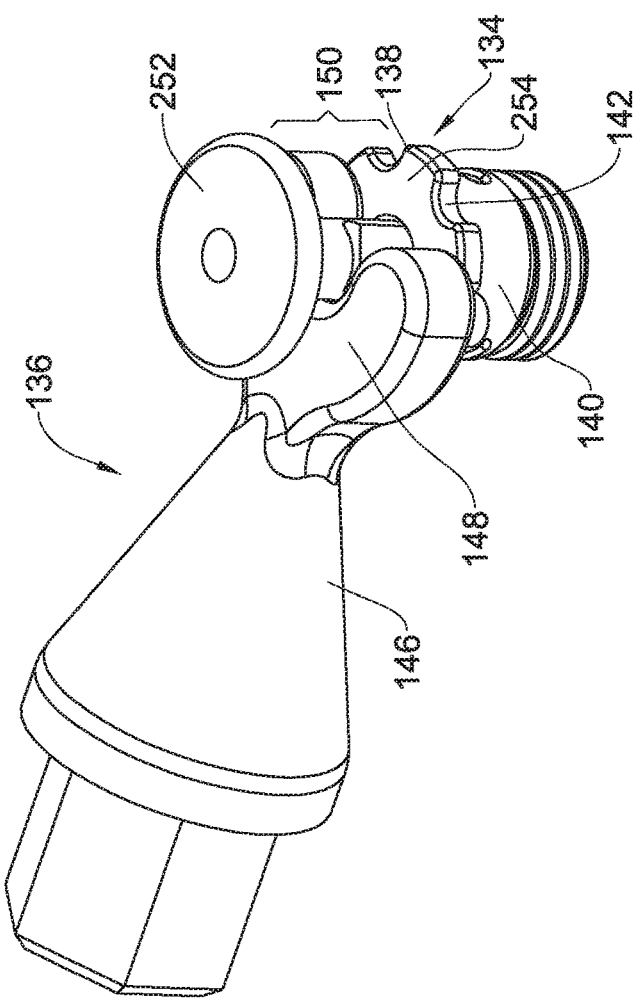
FIG. 4A is a top perspective view illustrating a dental lock according to yet another example of the disclosure, superimposed with a tool configured for use in conjunction therewith.
Figure 4B:
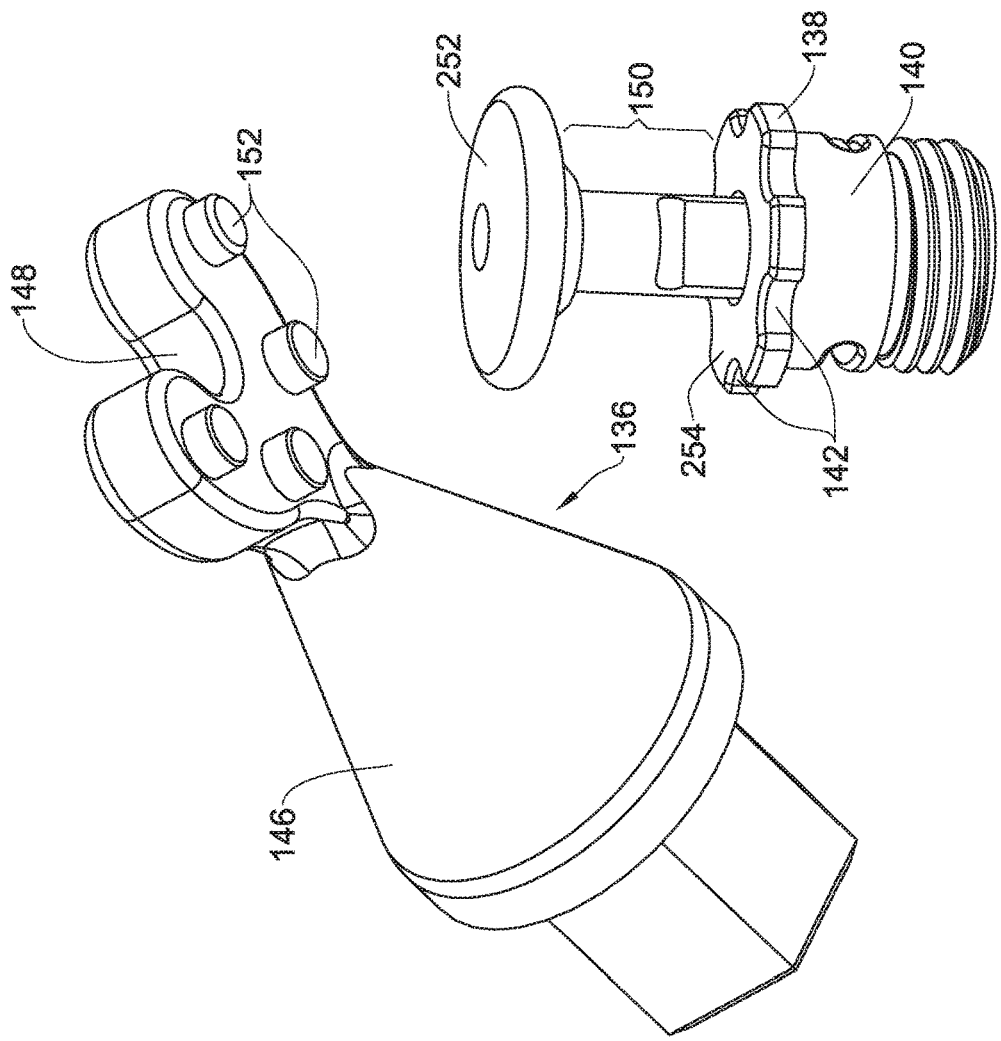
FIG. 4B is a perspective view illustrating the dental lock and the tool of FIG. 4A, apart from one another.

Yet another example of a dental lock 134 and a respective tool 136 is illustrated with reference to FIGS. 4A and 4B. in this example the lateral skirt portion 138 of the bushing 140 is configured over its perimeter with a plurality of sockets 142, wherein the gripping portion 146 of the tool 136 is configured with a U-shaped grip 148 comprising several gripping pins 152 (four in the present example) shaped and sized for interlocking with the of sockets 142, again wherein the grip 148 is sized and shaped for lateral insertion and placing at an expanded gap 150 extending between the bottom face of the manipulating end 252 and the proximal/top face 254 of the bushing 140 while at the unlocked position.

Figure 5A:
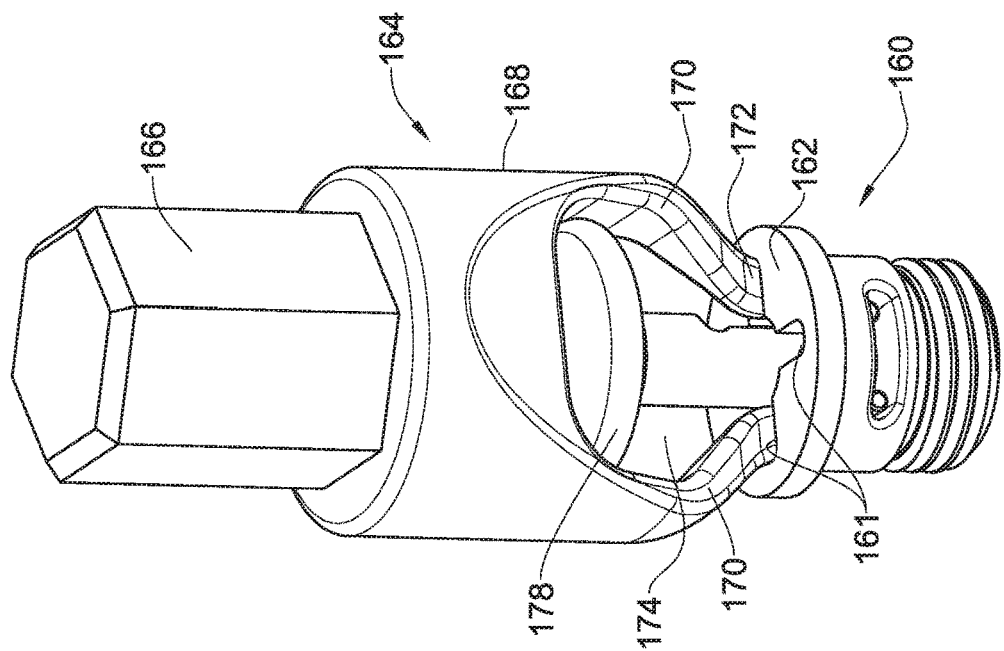
FIG. 5A is a top perspective view illustrating a dental lock according to still an example of the disclosure, superimposed with a tool configured for use in conjunction therewith.
Figure 6A:
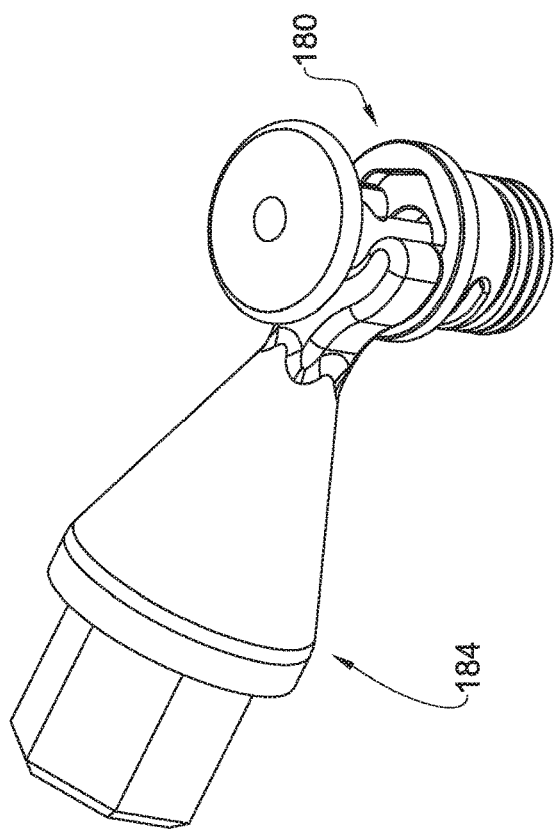
FIG. 6A is a top perspective view illustrating a dental lock according to a different example of the disclosure, superimposed with a tool configured for use in conjunction therewith.
Figure 5B:
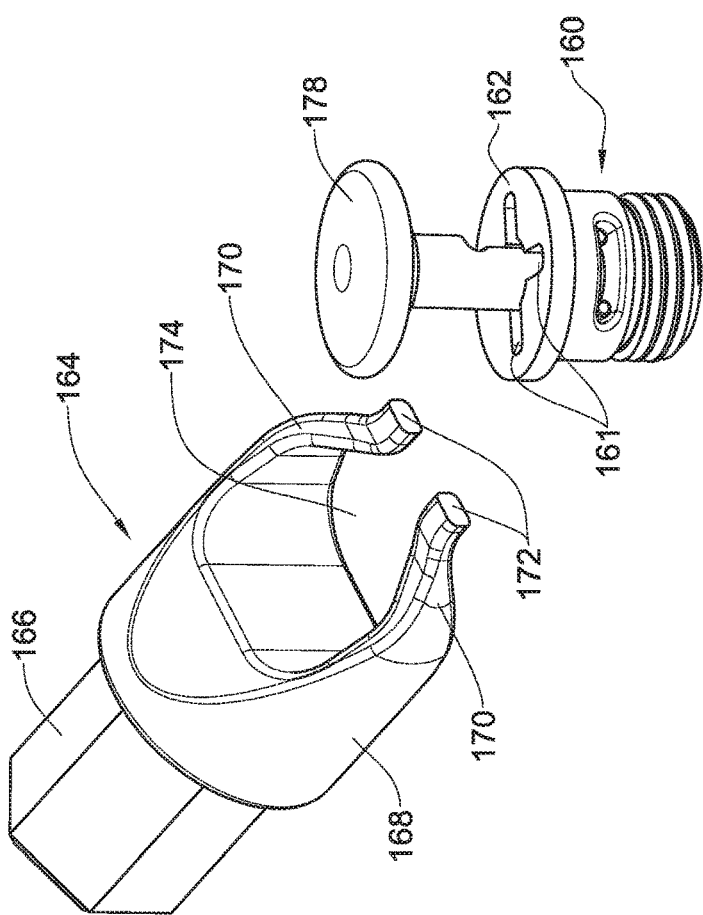
FIG. 5B is a perspective view illustrating the dental lock and the tool of FIG. 5A, apart from one another.
Figure 7A:
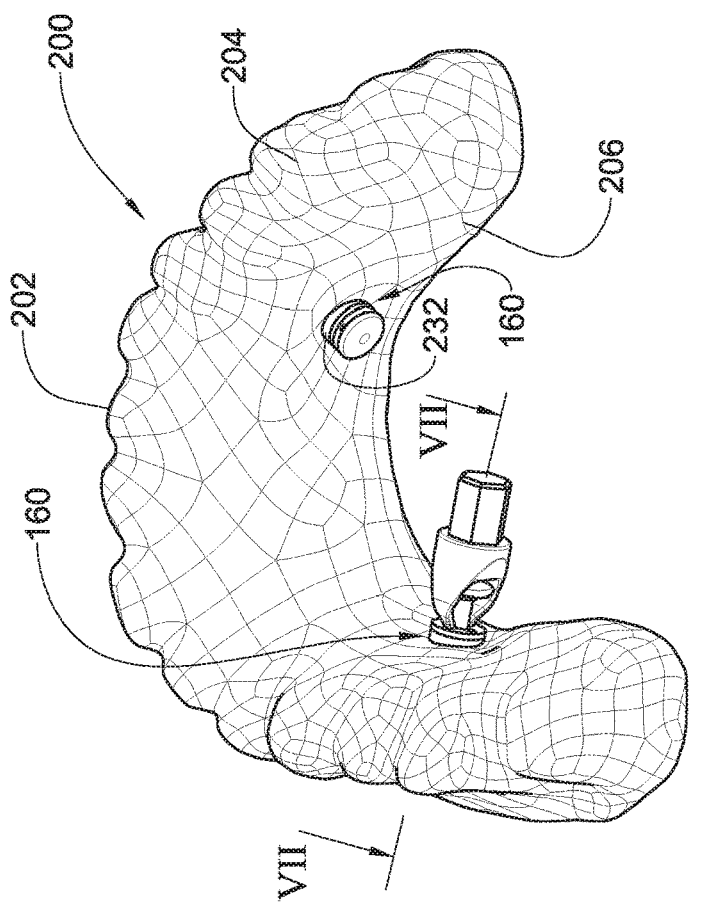
FIG. 7A is a top perspective view of a dental prosthesis according to the present disclosure, configured with two dental locks, one illustrated at a locked position, and the other illustrated at an unlocked position, with a tool fitted thereon.
Figure 6B:
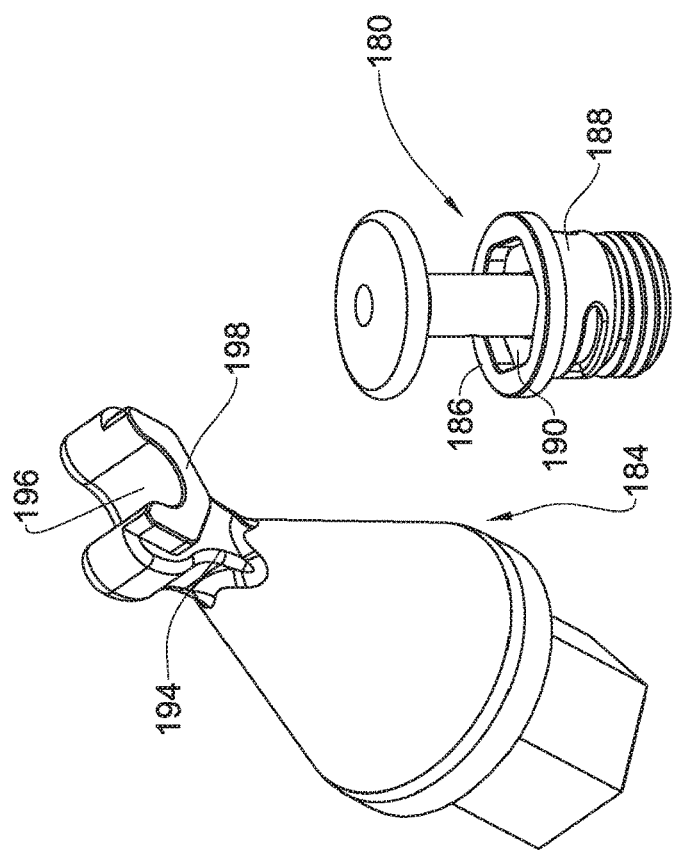
FIG. 6B is a perspective view illustrating the dental lock and the tool of FIG. 6A, apart from one another.

In FIGS. 5A and 5B there is illustrated a dental lock 160 and a tool 164 for use in conjunction therewith, wherein rather than lateral engagement of the tool with the lock, as illustrated hereinbefore, in the present example engagement is axial, i.e., along longitudinal axis X of the lock 160. The lock 160 can be the same as lock 20 (FIGS. 1, 2A and 2B), or lock 100 (FIGS. 2C and 2D), or a lock 134 configured with lateral sockets as discussed in connection with FIG. 4. In the illustrated example the dental lock 160 is similar to lock 100 of FIGS. 2C and 2D and comprises four radially disposed indentations 161 over the proximal face 162 of the lock. However, the tool 164 comprises a hexagonal shank handle portion 166 coaxial with a gripping portion 168 which is configured with two curved prongs 170 with their tips 172 shaped and sized for engagement within the indentations 161. The curved prongs 170 are so configured that there resides a space 174 between them for accommodating the manipulating end 178 of the lock 160, as seen in FIG. 5A.

Turning now to FIGS. 6A and 6B of the drawings, there is illustrated yet another example of a dental lock 180 and a manipulating tool 184 for use in conjunction. The lock 180 is configured at the proximal face 186 of the bushing 188 with a tool engaging portion in the form of a hexagonal depression 190. Respectively, a gripping portion 194 of the tool 184 has a U-shaped grip 196 with a projecting open hex 198 shaped and sized for engagement with the hexagonal depression 190 of the lock 180, as in FIG. 6A.

It is appreciated that rather than a hexagonal depression the tool engaging portion can be configured as an axial hexagonal projection configured for use with an open-type hex wrench. In such a case the bottom face of the manipulating portion of the locking pin can be flat, with the hexagonal projection generating a manipulating gap for fingernail insertion at the locked position of the dental lock (not shown).

Turning now to FIGS. 7A to 7F of the drawings, there is illustrated a dental denture generally designated 200 and comprising a dental prosthesis 202 with a teeth mimicking portion 204 and a gum skirt 206, made for example of acrylic material mimicking dental parameters of an individual. The dental prosthesis 202 is consolidated over a superstructure 210 (FIG. 7B), though it is appreciated that according to another example the dental prosthesis 202 can be integrally and uniformly manufactured.

The superstructure 210 is configured for removably positioning over a support member 222 such as support bar or abutments secured over dental implants which in turn are set within a jawbone of an individual. It is desired that a dental prosthesis be secured within the individual's mouth in a rigid yet easily removable and applicable fashion. Pin-type dental locks are configured for that purpose, wherein an individual can easily apply or remove the dental prosthesis 202, however when mounted it is sturdy and substantially motionless. When the dental prosthesis 202 is placed over the support members 222 the locking pin is displaced into its locked position so that its distal, locking portion arrests within a respective locking aperture 226 configured at the support members 222.

The superstructure 210 is configured with a plurality of upwardly projecting suds 211 supporting the teeth mimicking portion 204, and further it comprises two lock receptacles in form of a boss 232 configured with a lock coupling arrangement in form of an internal threading 234 configured for secure screw coupling with the threaded portion of the bushing of the dental lock 160. It is appreciated that the lock receptacle, i.e., the internally threaded boss 232, can be integral with the superstructure 210 (e.g., through a milling process) or it can be integrated thereto (e.g., by adhering, welding etc.). Furthermore, when the dental prosthesis 202 is applied over the superstructure 210, a proximal end of the boss is exposed at a surface of the dental prosthesis.

In regular course of use, the denture 200 can be easily applied by the individual, simply by placing it over the support member 222 (whilst at the unlocked position) and manipulating the locking pin into the locked depressed position. Removing the denture 200 takes place in a reverse sequence of operations, namely the locking pin is retracted (by inserting the individuals nail at the gap between the bottom face of the manipulating end of the locking pin and the proximal/top face of the bushing), and then the denture 200 can be removed.

Figure 7C:
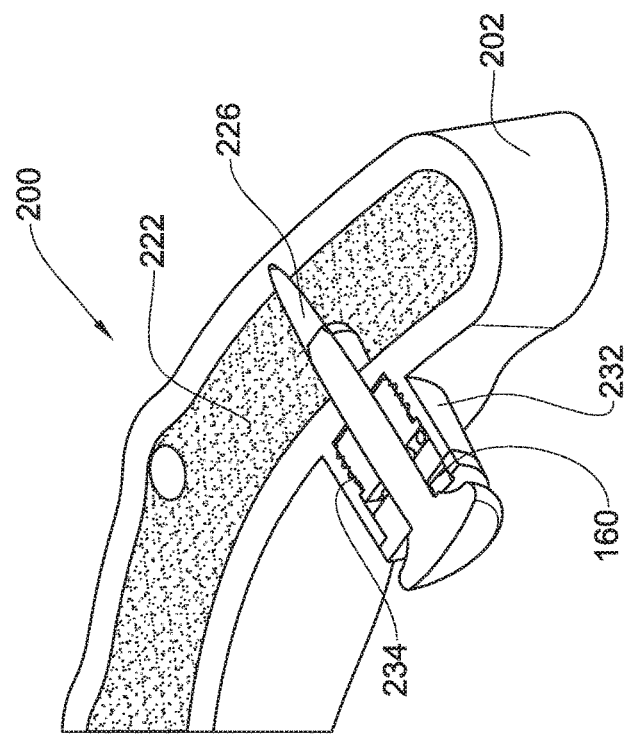
FIG. 7C is a partially sectioned view taken along line IV-IV in FIG. 7B.
Figure 7B:
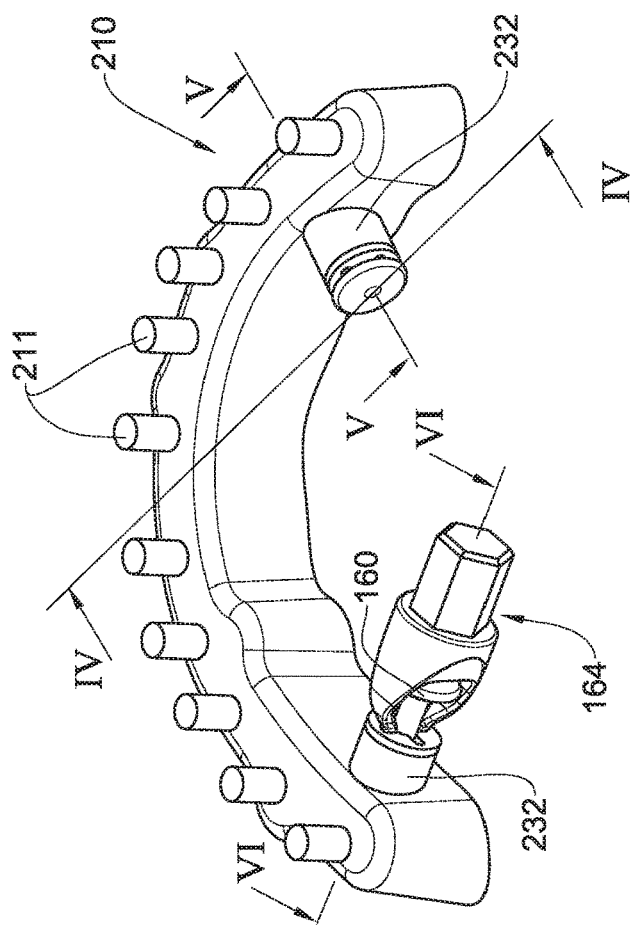
FIG. 7B illustrates the dental prosthesis of FIG. 7A, however without a tooth mimicking portion.
Figure 7E:
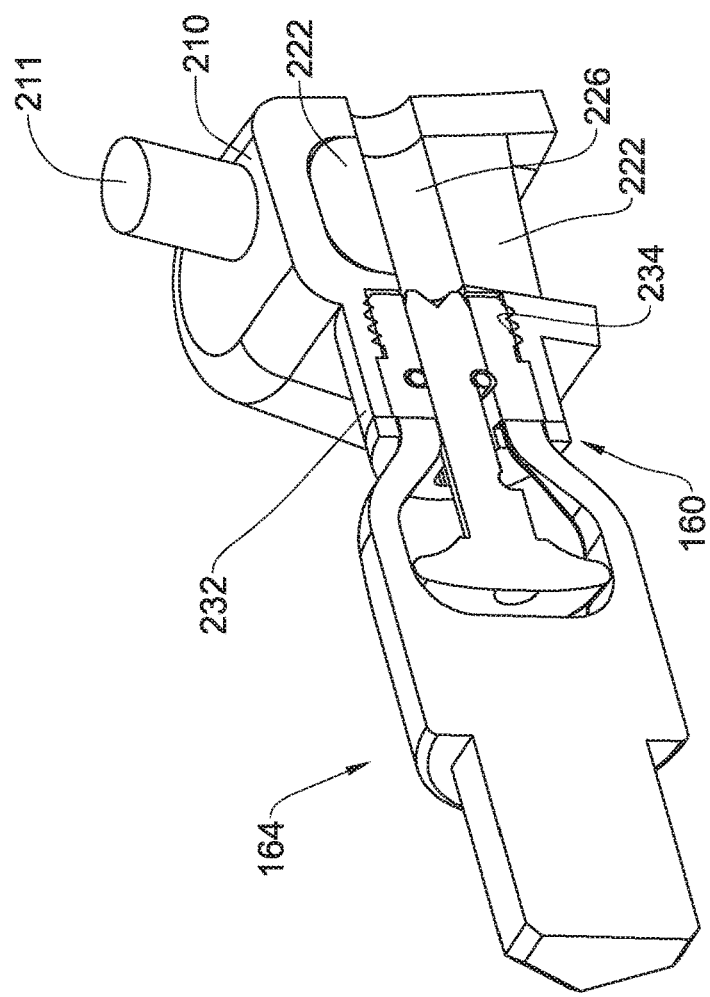
FIG. 7E is a section taken along line VI-VI in FIG. 7B.
Figure 7D:
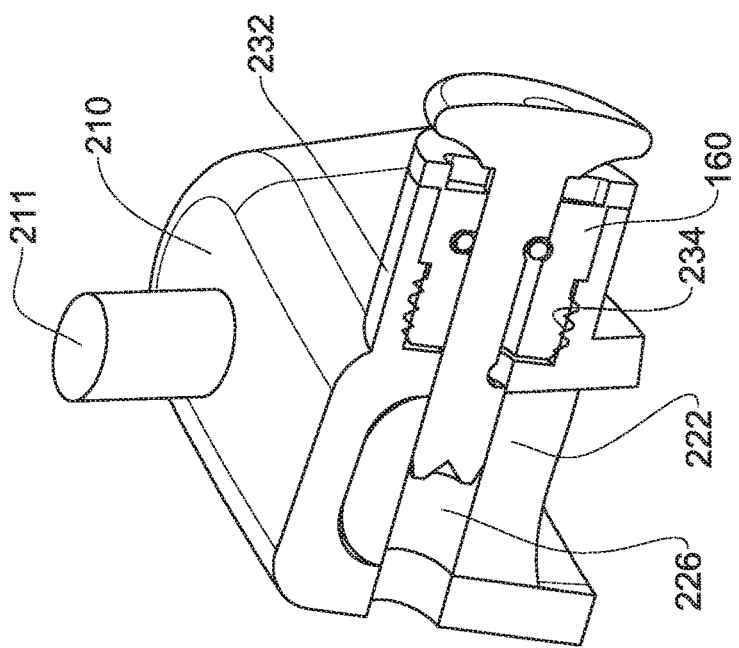
FIG. 7D section taken along line V-V in FIG. 7B.
Figure 8A:
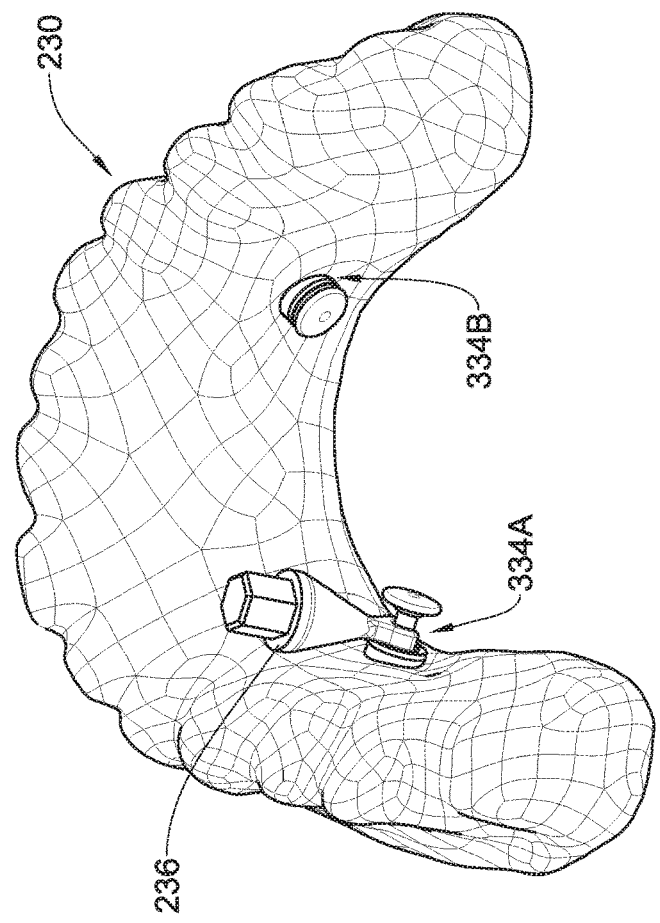
FIG. 8A is a top perspective lingual view of a dental prosthesis according to the present disclosure, configured with two dental locks, one illustrated at a locked position, and the other illustrated at an open position with a tool fitted thereon.
Figure 7F:
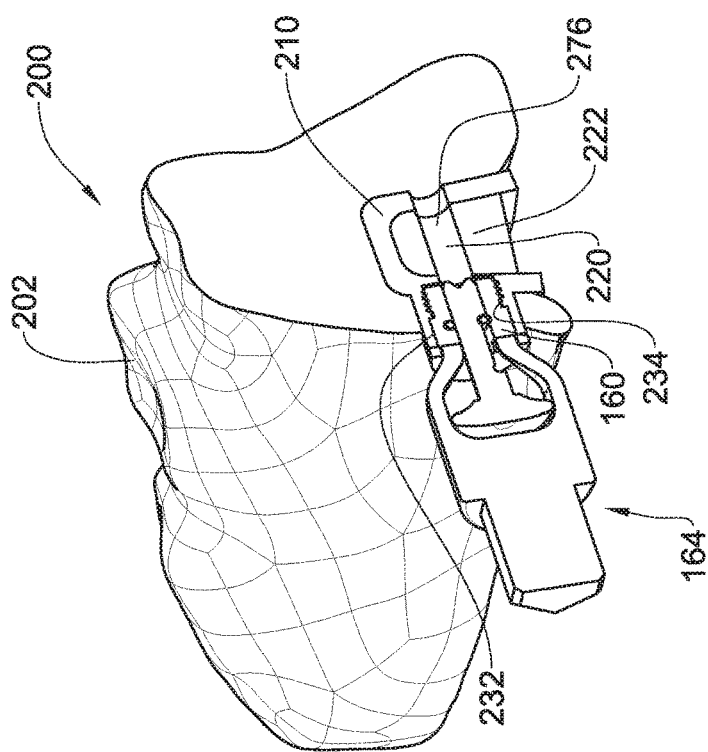
FIG. 7F is a section taken along line VII-VII in FIG. 7A.
Figure 8B:
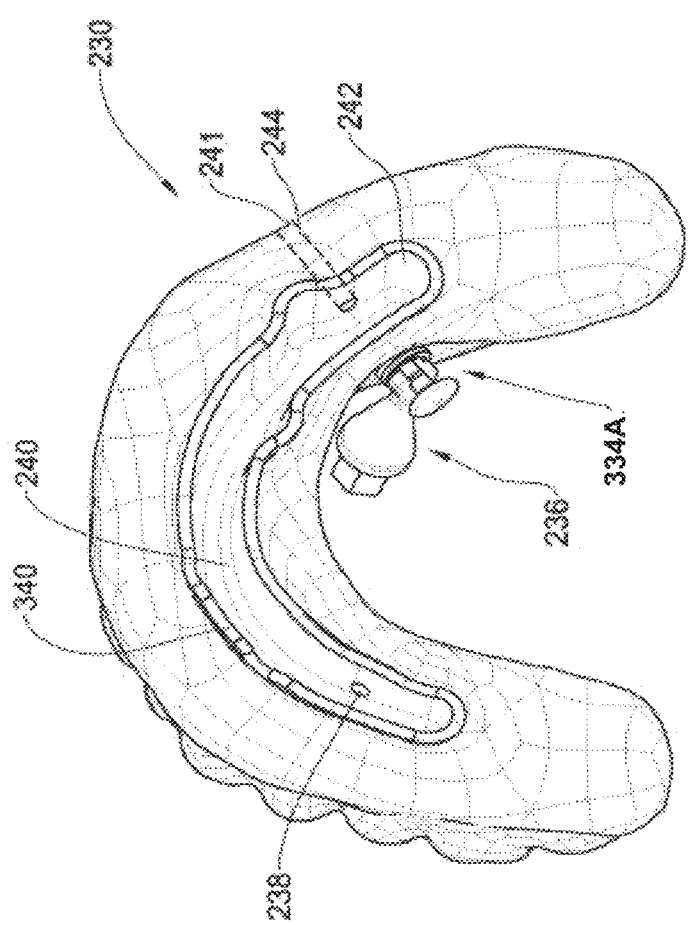
FIG. 8B is a bottom perspective view of FIG. 8A.

At the event that the lock has to be replaced, e.g., for replacement or repair, the denture is removed from the individual's mouth and while the lock is at its unlocked position a suitable tool is used for engagement with the tool engaging portion of the respective lock, as exemplified hereinabove. Rotating the bushing in one direction will open it and facilitate its removal, whilst rotating in an opposite direction locks it in place, however with a bottom face (e.g., 36 in FIG. 1) of the skirt portion of the bushing bearing against the proximal end of the lock receptacle (namely boss 232), so as to restrict axial displacement of the lock into the lock receptacle and define its position so as to obtain proper location of the locking pin at the locked position (FIGS. 7C and 7D).

It is appreciated that removing (and applying) a dental lock according to the disclosure can be facilitated also when the denture is mounted in the individual's mouth.

In the example of FIGS. 7A to 7F the dental lock and the respective tool are of the type disclosed hereinbefore in detail with reference to FIGS. 5A and 5B, namely wherein axial engagement takes place between the tool and the respective lock. However, in FIGS. 8A and 8B there is illustrated dental denture generally designated 230 configured with two dental locks 334A and 334B according to other examples of the present disclosure, wherein the tool 236 engages the dental lock 334A laterally. In the bottom view of FIG. 8B one can note the locking pin 238 of the lock 334B at its locked position, i.e., protruding into the space 242 of the superstructure 310, whilst the locking pin of lock 334A does not project into the space 242. Also noted, a labial face of the denture is configured with an opening 241 coaxially extending opposite the locking pin and also through a labial face of a gum portion (represented by dashed lines 244), whereby the locking pin can be pushed into its unlocked position using a fine rod.

Those skilled in the art to which this invention pertains will readily appreciate that numerous changes, variations, and modifications can be made without departing from the scope of the presently disclosed subject matter, *mutatis mutandis*.

The invention claimed is:

1. A denture system, comprising:
   a denture; and
   one or more removable denture locks;
   wherein said denture comprises:
   one or more support members and a prosthesis configured for being positioned thereover and secured thereto;
   one or more lock receptacles, each comprising an internal lock coupling arrangement unitarily formed with said prosthesis or one of said one or more support members; and
   each of said one or more removable denture locks comprising a tubular bushing extending along a longitudinal axis between a distal end and a proximal end and configured with a bore accommodating a locking pin displaceable between a locked position at which the locking pin projects from the distal end of the bushing, and an unlocked position at which the locking pin is at least partially retracted, and wherein at least a portion of an external surface portion of the tubular bushing is configured with a coupling arrangement for cooperating with one of said internal lock coupling arrangements of said denture, and wherein said tubular bushing comprises a laterally projecting skirt portion at the proximal end, a distal face of said laterally projecting skirt portion being configured to at least partially bear against a proximal end of a corresponding lock receptacle for restricting axial insertion of the denture lock into said denture.

2. The denture system according to claim 1, wherein the proximal end of the tubular bushing comprises a tool engaging portion facilitating insertion and removal of the denture lock from the denture.

3. The denture system according to claim 2, wherein a perimeter of said laterally projecting skirt portion is formed with a plurality of sockets constituting said tool engaging portion.

4. The denture system according to claim 3, wherein said denture lock is configured for receiving, by at least two of said sockets simultaneously, corresponding pins of a tool inserted in a single lateral direction relative to said longitudinal axis.

5. The denture system according to claim 4, wherein said denture lock comprises at least three of said sockets.

6. The denture system according to claim 2, wherein the tubular bushing includes a proximal face that is formed with a depression formed at least partially around said longitudinal axis constituting said tool engaging portion.

7. The denture system according to claim 6, wherein the locking pin includes a proximal end comprising a laterally extending manipulating member, and wherein said manipulating member includes a distal face that is planar.

8. The denture system according to claim 7, wherein said depression provides a manipulating gap configured to accommodate insertion of a fingernail of a user, at least when the locking pin is in the locked position.

9. The denture system according to claim 1, wherein said coupling arrangement comprises a threaded portion.

10. The denture system according to claim 1, wherein the denture lock further comprises a retention member extending through the tubular bushing and configured for restricting axial displacement of the locking pin within the tubular bushing.

11. The denture system according to claim 10, wherein the retention member is a U-shaped spring member extending through a lateral spring retention aperture formed in the tubular bushing.

12. The denture system according to claim 11, wherein the lateral spring retention aperture intersects the bore of the tubular bushing accommodating the locking pin.

13. The denture system according to claim 1, wherein the laterally projecting skirt portion of the tubular bushing comprises a tool engaging portion selected from a group consisting of:
   a polygonal nut capturing portion; and
   one or more recesses for engagement by a pin spanner tool.

14. The denture system according to claim 1, wherein said internal lock coupling arrangement comprises a threaded portion.

15. The denture system according to claim 1, wherein each of said lock receptacles comprises a boss extending from the support member or the prosthesis.

16. A denture lock, comprising:
   a tubular bushing extending along a longitudinal axis between a distal end and a proximal end, the tubular bushing configured with a bore accommodating a locking pin displaceable between a locked position at which the locking pin projects from the distal end of the tubular bushing, and an unlocked position at which the locking pin is at least partially retracted; and
   wherein at least a portion of an external surface portion of the tubular bushing comprises a coupling arrangement for removably securing to a lock receptacle of a denture, the proximal end of the tubular bushing being configured with a tool engaging portion facilitating insertion and removal of the denture lock from the denture; and
   wherein said tubular bushing comprises a laterally projecting skirt portion at the proximal end, a distal face of said laterally projecting skirt portion configured to bear on a proximal face of the lock receptacle for restricting axial insertion of the denture lock into the denture.

17. The denture lock according to claim 16, wherein a perimeter of said lateral projecting skirt portion is formed with a plurality of sockets constituting said tool engaging portion, and is configured for receiving, by at least two of said sockets simultaneously, corresponding pins of a tool inserted in a single lateral direction relative to said longitudinal axis.

18. The denture lock according to claim 16, wherein the tubular bushing includes a proximal face is formed with a depression formed at least partially around said longitudinal axis constituting said tool engaging portion, a proximal end of the locking pin comprising a laterally extending manipulating member, wherein said depression provides a manipulating gap configured to accommodate insertion of a fingernail of a user, at least when the locking pin is in its locked position.

19. The denture lock according to claim 18, wherein said manipulating member includes a distal face that is planar.

20. The denture lock according to claim 16, wherein the coupling arrangement comprises a threaded portion.

\* \* \* \* \*